United States Patent [19]

Ozeki

[11] 4,368,981
[45] Jan. 18, 1983

[54] OPTICAL SENSING SYSTEM

[75] Inventor: Takeshi Ozeki, Tokyo, Japan

[73] Assignee: Tokyo Shibaura Denki Kabushiki Kaisha, Kawasaki, Japan

[21] Appl. No.: 173,421

[22] Filed: Jul. 29, 1980

[30] Foreign Application Priority Data

Jul. 30, 1979 [JP] Japan .................. 54/96060

[51] Int. Cl.³ ............................................. G01B 9/02
[52] U.S. Cl. ...................................... 356/352; 356/349
[58] Field of Search ................ 356/349, 352, 361, 350

[56] References Cited

U.S. PATENT DOCUMENTS 4,183,670 1/1980 Russell .................................. 356/350

OTHER PUBLICATIONS

H. Hubota, "Wave Optics", Iwanami Bookstore, pp. 126–129, Jan. 30, 1979 (first edition issued Feb. 2, 1971).

Primary Examiner—Bruce Y. Arnold

Attorney, Agent, or Firm—Oblon, Fisher, Spivak, McClelland & Maier

[57] ABSTRACT

In an optical sensing system a laser beam is split by a 3dB optical directional coupler into two beams which in turn are launched into single mode optical fibers of different lengths. Since the two single mode optical fibers are maintained at the temperature to be measured, a phase difference is produced between the beams transmitted through the optical fibers. The beams passing through the optical fibers are synthesized by the 3dB optical directional coupler to form an interference pattern comprised of "light" and "dark" regions. The wavelength of the light beam is monotonically varied over a predetermined range so as to cause these regions to vary in position. This variation in position is manifested at a given point in the interference pattern as a variation in signal amplitude, and this variation in signal amplitude is detected to infer the temperature to be measured.

11 Claims, 4 Drawing Figures

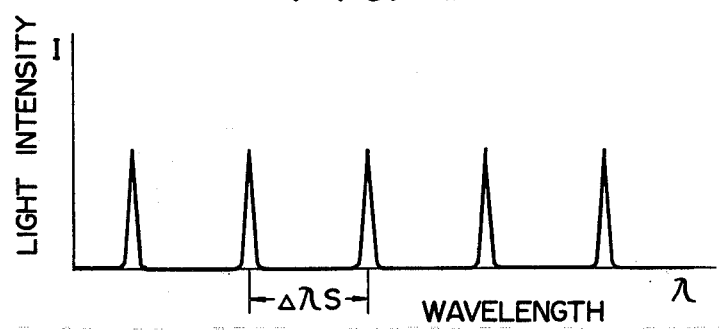
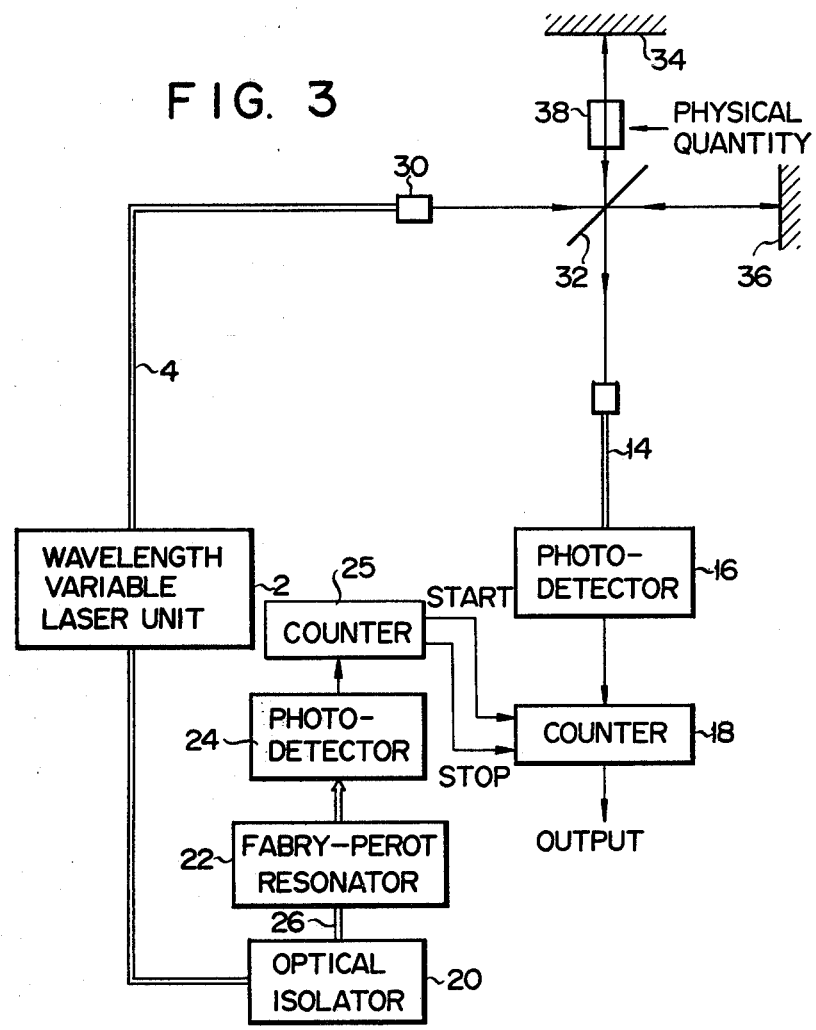

OPTICAL SENSING SYSTEM

BACKGROUND OF THE INVENTION

1. Field of the Invention

This invention relates to an optical sensing system for industrial measurement.

2. Description of the Prior Art

From a need for a complete safeguard against explosion in a chemical plant as well as a measure against an antiground potential difference in a heavy electrical apparatus and a measure against noises etc., an optical sensing system covering the entire route from signal transmission to signal translation as an optical means has come into the limelight in place of a conventional electrical sensing system.

In a measurement by an optical means in particular, the technique of a light interferometer utilizing the shortness of an optical wavelength is currently used so that sensing can be effected at high accuracy and high sensitivity. A wavelength interferometer is known which is adapted to measure a physical quantity at a place by measuring a shift of an interference fringe which is produced by varying an optical path length of a path at that place by the physical quantity such as temperature, pressure, length etc. In the optical sensing system of this type it is easy to know a variation of a to-be-measured quantity at high accuracy by making longer an optical path at the place where measurement is effected. In order to find the absolute value of the to-be-measured quantity it is necessary to know how many light or dark bands are moved in an interference fringe. This involves a time-consuming operation.

SUMMARY OF THE INVENTION

It is accordingly the object of this invention to provide an optical sensing system which can measure the absolute value of a to-be-measured physical quantity at high accuracy.

According to this invention there is provided an optical sensing system comprising; means for generating a coherent light beam whose wavelength is monotonically varied with time; means for transferring the coherent light beam; means for dividing the light beam transferred into two beams; means for sensing a physical quantity based on a phase difference which is produced between the two beams dependent upon the physical quantity to be measured; means for synthesizing the two beams through intereference to produce an amplitude-modulated optical signal; means for transfering the beam; and means for detecting an amplitude variation of the beam transferred as a function of the physical quantity.

BRIEF DESCRIPTION OF THE DRAWINGS

This invention can be more fully understood from the following detailed description when taken in conjunction with the accompanying drawings, in which:

FIG. 2 is a graph showing the characteristic of a Fabry-Perot resonator as shown in FIG. 1; and FIGS. 3 and 4 are block diagrams each showing an optical sensing system according to another embodiment of this invention.

DESCRIPTION OF THE PREFERRED EMBODIMENTS

Figure 1:
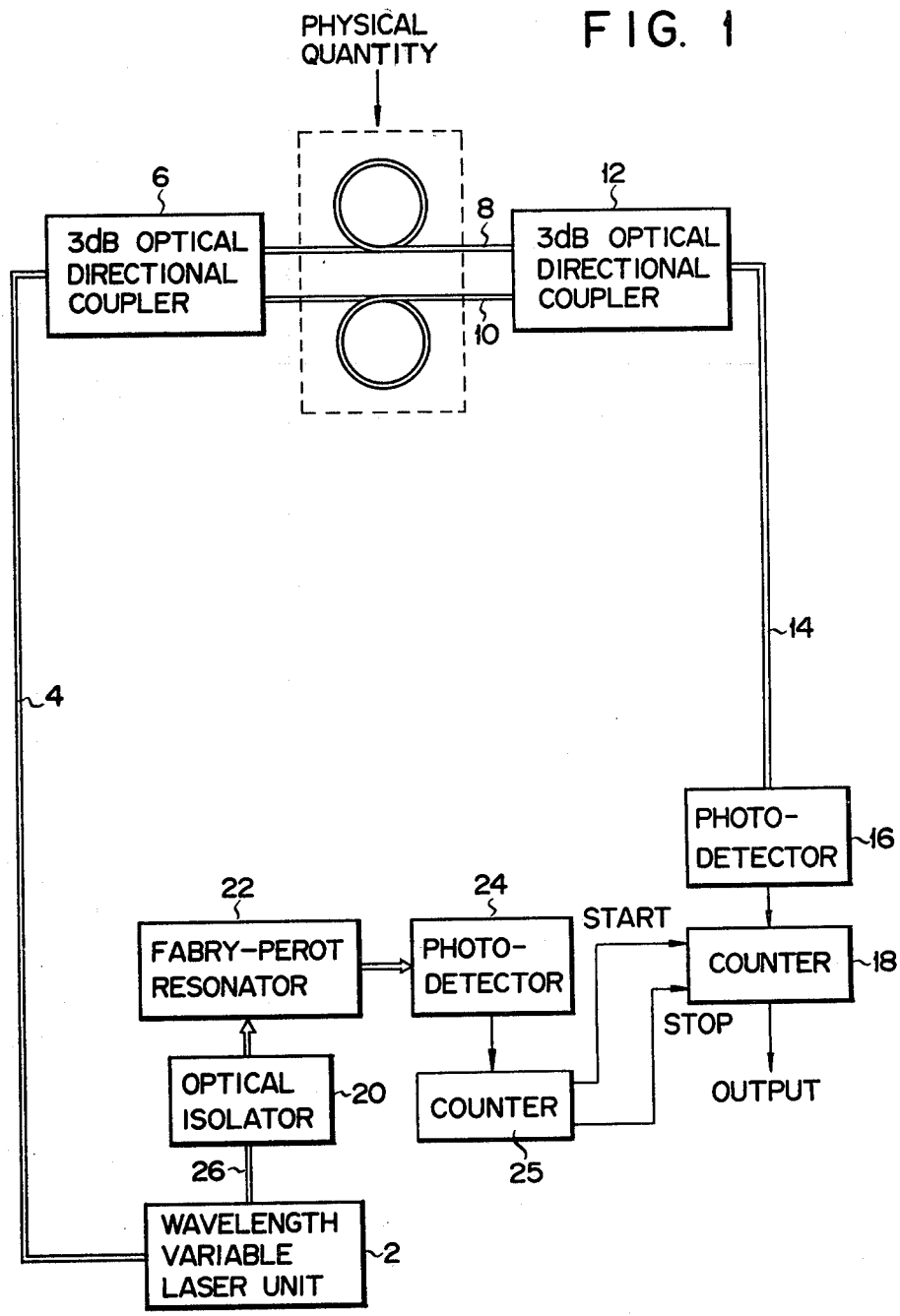
FIG. 1 is a block diagram showing an optical sensing system according to one embodiment of this invention.

Referring to FIG. 1 an optical sensing system according to one embodiment of this invention is shown. The system includes a wavelength variable laser unit 2 for monotonically increasing or decreasing the wavelength of emergent laser beams from $\lambda$ to $\lambda+\Delta\lambda$ or $\lambda-\Delta\lambda$ with time. The laser unit 2 has a laser diode of which the oscillation wavelength monotonically varies by varying the ambient temperature around the laser diode. As well known, the wavelength $\lambda$ of the laser beam generated from the laser diode can be varied. For example, the wavelength can be varied by the extent of 3 to 4 Å, usually 2 Å, per 1° C. The laser diode of the unit 2 has its oscillation wavelength $\lambda$ varied by varying an injection current. For example, the oscillation wavelength $\lambda$ can be monotonically increased by the extent of 0.4 Å by varying the injection current of about 1 mA. As set out in M. Okuda et al.; "Tunability of Distributed Bragg-reflector Laser by using the Electro-Optic effect" papers on Technical Group Meeting of Inst. Electron, Commun, Eng. Jpn. OQE 76-61 (1976) (in Japan), the refractive index of a distributed Brugg reflector area of a laser diode is varied by applying an electric field to the laser diode, to permit the oscillation wavelength $\lambda$ to be monotonically increased.

A laser beam generated by the wavelength variable laser unit 2 is split into first and second beams for distribution. The first beam is supplied by way of an optical fiber 4 to a 3 dB optical directional coupler 6 which is located in a measuring area. The beam so supplied is split by the coupler 6 into two beams equal in intensity to each other which are launched into first and second optical fibers optically connected to the coupler 6. At least one of the optical fibers 8 and 10 is located on a point where a physical quantity is measured. The characteristic of the optical fiber, i.e. the refractive index of the core and cladding of the optical fiber is varied by the physical quantity from the above-mentioned point. As a result, the optical path length of the optical fibers 8 and 10 is varied to permit a phase difference to occur between the two beams. The two dephased beams are supplied to a second 3 dB optical directional coupler 12, located in the measuring area, where the light intensity or light amplitude is modulated through additive interference. The amplitude-modulated optical signal is supplied through an optical fiber 14 to a photodetector 16 where it is converted to an electric signal. As explained in more detail, the optical signal from the coupler 12 is an alternate light-and dark-band optical signal i.e. an optically digitized signal. In consequence, the electric signal is supplied to a counter 18 where it is counted.

The above-mentioned second laser beam from the wavelength variable laser unit 2 is supplied by way of an optical fiber 26 to a Fabry-Perot resonator 22 through an optical isolator 20 which prevents a return of the laser beam. As already known in the art, the Fabry-perot resonator 22 has, for the incident beam, a resonance wavelength $\lambda$ corresponding to a free spectrum range $\Delta\lambda s(=\lambda^2/2L)$ defined by a length L between a pair of half mirrors not shown and has the characteristic of emitting a light beam of a resonance wavelength as shown in FIG. 2. Where the wavelength $\lambda$ of the laser beam emitted from the wavelength variable laser unit 2 is monotonically increased to $\lambda+\Delta\lambda$, laser beam impulses are supplied from the Fabry-Perot resonator to a photodetector 24, the number of the laser beam impulses corresponding in number to the number of resonance wavelengths included in a monotonically increasing wavelength range of from $\lambda$ to $\lambda+\Delta\lambda$. By counting the number of electric pulses from the photodetector 24 by means of the counter 25 it is possible to detect a change in wavelength of laser beams from $\lambda$ to $\lambda+\Delta\lambda$ or $\lambda-\Delta\lambda$.

When the counter 25 starts to count the electric pulse, it supplies a start signal to the counter 18, starting the counter 18 to count the electric signals supplied from the photodetector 16. When the counter 25 have counted a predetermined number of electric pulses, it supplies a stop signal 18, stopping the counter 18 to count the electric signals from the photodetector 16. The physical quantity to be sensed is quantized by counting the number of electric pulses by the counter 18 during the time period from the generation of the start signal to the generation of a stop signal.

Suppose that a phase difference $\phi$ between both the laser beams is $2m\pi (m=1, 2 \ldots n)$ which is given by a physical quantity involved when both laser beams of a specified wavelength $\lambda$ pass through the single mode optical fibers 8 and 10. In this case, an optical signal produced through the addition of both the laser beams at the second 3 dB optical directional coupler has an amplitude of "light" as opposed to "dark". If, likewise, a phase difference $\phi$ between both the laser beams is $(2m+1)\pi (m=1, 2 \ldots n)$, the optical signal has an amplitude of "dark". The phase difference $\phi$ varied dependent not only upon the physical quantity to be measured, but also the wavelength of the laser beam. In consequence, if the wavelength $\lambda$ of the laser beams minutely varies while the physical quantity to be measured does not vary, the phase difference $\phi$ varies. If, for example, the wavelength of the laser beams is monotonically increased from $\lambda$ to $\lambda+\Delta\lambda_1$, the corresponding difference $\phi$ varies from $2m\pi$ to $(2m+1)\pi$ or from $(2m+1)\pi$ to $2m\pi$. As a result, the optical signal is intensity modulated from the amplitude of "light" to the amplitude of "dark" and vice versa. The same event also occurs when the wavelength of the laser beam is increased from $\lambda+\Delta\lambda_1$ to $(\lambda+\Delta\lambda_1)+\Delta\lambda_2$. With the monotonic increase of the laser beam width from $\lambda$ to $\lambda+\Delta\lambda(\Delta\lambda=\Delta\lambda_1+\Delta\lambda_2+ \ldots +\Delta\lambda_n)$ the amplitude of the optical signal varies and the photodetector 16 detects an alternate light and dark variation. The number of "light" or "dark" bands i.e. the number of optical pulses, N, as detected by the photodetector 16 bears a predetermined relation to the physical quantity as evident from the relation of the physical quantity (to be measured) to the sensitivity as will be later explained. When the counter 18 counts the number of optical pulses, N, as detected by the photodetector 16 until the number of the optical signals supplied from the Fabry-Perot resonator 22 to the photodetector 24 reaches a predetermined number, the physical quantity is determined. In other words, the counter 18 starts the count of the optical pulses by the optical signals from the Fabry-Perot resonator 22 and when the number of the optical signals from the resonator 22 reaches a predetermined number, the counter 18 ends the count of the optical pulses and the number of optical pulses, N, is supplied as an output signal to, for example, the processor (not shown). The processor gives an instruction to a controller for controlling the point (where the physical quantity is measured) by the output corresponding to the number of optical pulses, N, counted. Or the processor permits a physical quantity corresponding to the number of counted optical pulses, N, to be displayed on a display unit.

Explanation will be given below of the relation of an actual physical quantity to the phase difference $\phi$ as well as the theoretical sensitivity of the optical sensing system to the actual physical quantity.

Suppose that the physical quantity is a temperature. With the lengths of the single mode optical fibers 8 and 10 represented by L1 and L2, respectively, and the temperatures of the fibers 8 and 10 by $T_1$ and $T_2$, respectively, the phase difference $\phi$ will be given below:

$$\phi = 2\pi \left( n \cdot \frac{1}{L_1} \cdot \frac{dL_1}{dt} + \frac{dn}{dt} \right) \cdot \frac{L_1 T_1}{\lambda} \quad (1)$$

$$-2\pi \left( n \cdot \frac{1}{L_2} \cdot \frac{dL_2}{dt} + \frac{dn}{dt} \right) \cdot \frac{L_2 T_2}{\lambda}$$

where $T_1$, $T_2$ denotes the relative temperatures with a temperature $T_0$ as a reference and n denotes the refractive index of the cores of the optical fibers 8 and 10. Assume that the optical fibers are made of the same material and that the linear expansion coefficients $\alpha$ $$\alpha = \frac{1}{L_1} \cdot \frac{dL_1}{dt} = \frac{1}{L_2} \cdot \frac{dL_2}{dt}$$

of the fibers are equal to each other. Equation (1) is reduced to $$\phi = \frac{2\pi}{\lambda} \left( n\alpha + \frac{dn}{dt} \right) (L_1 T_1 - L_2 T_2) \quad (2)$$

The variation of the phase difference when the wavelength $\lambda$ suffers a minute variation is $$\frac{\partial \phi}{\partial \lambda} = \phi \cdot \left\{ -\frac{1}{\lambda} + \frac{\left( \alpha \frac{dn}{\partial \lambda} + \frac{\partial^2 n}{\partial \lambda \partial T} \right)}{n\alpha + \frac{\partial n}{\partial T}} \right\} \quad (3)$$

The variation $\psi$ of the phase difference $\phi$ when the wavelength of the laser beam is monotonically increased from $\lambda$ to $\lambda+\Delta\lambda$ is $$\psi = \frac{\partial \phi}{\partial \lambda} \{(\lambda + \Delta\lambda) - \lambda\} \quad (4)$$

$$= \frac{\partial \phi}{\partial \lambda} \Delta\lambda$$

$$= \phi \cdot \frac{\partial \lambda}{\lambda} \cdot \left\{ 1 - \frac{\lambda \left( \alpha \frac{\partial n}{\partial \lambda} + \frac{\partial^2 n}{\partial \lambda \partial T} \right)}{\left( n\alpha + \frac{\partial n}{\partial T} \right)} \right\}$$

Where the wavelength of the laser beam from the laser unit 2 is monotonically increased, the optical pulse from the second 3 dB optical directional coupler 12 has an amplitude of "light" or "dark" corresponding to each $2\pi$ variation of the phase difference $\phi$. In consequence, the number of optical pulses, N, counted by the counter 18 corresponds to the integral part of a number obtained by dividing the variation $\psi$ of the phase difference $\phi$ by $2\pi$.

$$N = [|\psi|/2\pi] \qquad (5)$$

As evident from Equations (4) and (5) the number of optical pulses, N, counted is a function of a temperature T. If the integral number, N, counted is determined, it is possible to find out the temperature T. That is, the variation $\psi$ of the phase difference $\phi$ can be found from the integral number, N, of Equation (5) and the phase difference $\phi$ from Equation (4), since the quantity in the curly brackets of Equation (4) is constant and since $\Delta\lambda/\lambda$ is beforehand determined by the laser unit 2. The temperature $T_1$ or $T_2$ can be found from Equation (2) if the phase difference $\phi$ is obtained. Where the temperatures $T_1$ and $T_2$ given to the fibers 8 and 10 are equal to each other ($T_1 = T_2$) the lengths of the fibers 8 and 10 can be made different from each other ($L_1 \neq L_2$). By maintaining one of the fibers 8 and 10 at a known reference temperature it is possible to know the temperature given to the other fiber.

Explanation will be given below of the snsitivity of the present system based on the above-mentioned Equations which uses single mode fibers 8 and 10 made of quartz.

Table I shows the value of each term of Equations (2) and (4). The value already appears in I. H. Malitson, "Interspecimen Comparison of the Relative Index of Fused Silica" Journal of the Optical Society of America Vol. 55, No. 10, Oct. 1965, page 1205.

TABLE I

| $\lambda$ | 0.63$\mu$ band | 1$\mu$ band |
|---|---|---|
| n | 1.457 | 1.451 |
| $\frac{\partial n}{\partial T}$ | $10.4 \times 10^{-6}/°C$ | $10.5 \times 10^{-6}/°C$ |
| $\alpha$ | $5 \times 10^{-7}/°C$ | $5 \times 10^{-7}/°C$ |
| $\frac{\partial n}{\partial \lambda}$ | $-3.11 \times 10^4/m$ | $-1.33 \times 10^4/m$ |
| $\frac{\partial^2 n}{\partial T \partial \lambda}$ | $10^{-1}/°C \cdot m$ | $-1.2/°C \cdot m$ |

The temperature sensitivity of the system of this invention as found from the numerical values of Table I is shown in Table II, where it is assumed that a variation $\Delta\lambda$ of the wavelength $\lambda$ of the laser beam is enough small i.e. $\Delta\lambda/\lambda << 1$.

TABLE II

| $\lambda$ | 0.63$\mu$ band | 1$\mu$ band |
|---|---|---|
| $\phi_0$ | 111 radians/°cm | 70.5 radians/°cm |
| $\phi_0/2\pi$ | 17.7 fringes/°cm | 11.2 fringes/°cm |
| $\psi_0$ | 110 $\Delta\lambda/\lambda$ radians/°cm | 78.1 $\Delta\lambda/\lambda$ radians/°cm |
| $\psi_0/2\pi$ | 17.6 $\Delta\lambda/\lambda$ fringes/°cm | 12.4 $\Delta\lambda/\lambda$ fringes/°cm |

$\phi_0$ means that a phase difference per meter between both the laser beams occurs for a 1° C. temperature rise when laser beams of a specified wavelength $\lambda$ pass through the fibers 8 and 10. At this time, the optical pulses of light or dark band occur, the number of the optical pulses corresponding to the number of an integral part of a value $\phi_0/2\pi$. $\psi_0$ denotes a variation of a phase difference per unit temperature given to the unit length (optical fibers) between both the laser beams when the laser beams vary from $\lambda$ (specified wavelength) to $\lambda + \Delta\lambda$, the number of optical pulses corresponding to a value of an integral part of $\psi_0/2\pi$.

From Table II it will be understood that the sensitivity of the optical sensing system when the wavelength of the laser beams is monotonically increased from $\lambda$ to $\lambda + \Delta\lambda$ is proportional to the increment $\Delta\lambda$.

Where a laser diode having a maximum wavelength variable range of about 50 Å is used as a laser unit 2, the length of one of the optical fibers 8 and 10 which can obtain a 0.1% accuracy over a temperature measuring range of about 500° C. with a 0.5° C. minimum detection temperature scale is given by Table III.

TABLE III

| $\lambda$ | 0.63$\mu$ band | | 1$\mu$ band | |
|---|---|---|---|---|
| $\Delta\lambda/\lambda$ | 0.5% | 0.1% | 0.5% | 0.1% |
| L | 5.7m | 28.4m | 8m | 40m |

As apparent from Table III, if the temperature variable range $\Delta\lambda$ is about 10 Å a longer optical fiber will be required. Since the optical fiber has a smaller diameter of 0.1 mm, if it is wound, its volume does not become greater and can be restricted to substantially $2 \times 2 \times 0.2$ cm. The coherent length of laser beams emitted from the laser diode is enough greater, permitting the optical fiber to be used as a sensor.

Suppose that the physical quantity is a pressure. With $L_1$ and $L_2$ representing the lengths of the single mode optical fibers 8 and 10, respectively, and $P_1$ and $P_2$ representing pressures being applied to the fibers 8 and 10, respectively, if the optical fiber isotropically suffers pressure $\phi$, then the three-direction vector components of the stress of the optical fibers resulting from the pressure $\phi$ will be $$\sigma = \begin{bmatrix} -P \\ -P \\ -P \end{bmatrix} \qquad (6)$$

The resulting deformations will be:

$$\epsilon = \begin{bmatrix} \epsilon_x \\ \epsilon_y \\ \epsilon_z \end{bmatrix} = \begin{bmatrix} -P(1-2\mu)/E \\ -P(1-2\mu)/E \\ -P(1-2\mu)/E \end{bmatrix} \qquad (7)$$

where
$\mu$: Poisson ratio
E: Young's modulus

Here the linear approximation of the phase transition of each optical fiber resulting from the deformation will be $$\Delta\phi = \beta\Delta L + L\Delta\beta \qquad (8)$$

$$\beta\Delta L = \beta\epsilon_z L = -\beta(1-2\mu)LP/E \qquad (9)$$

$$L\Delta\beta = L\frac{d\beta}{dn}\Delta\lambda + L\frac{d\beta}{dD}\Delta D \qquad (10)$$

where
D: the diameter of the fiber
$\beta$: $n_{eff}k$.

Since a difference between the diffraction indices of the core and cladding of the optical fiber is below about 1%, $$d\beta/dn = k \quad \ldots (11)$$

the optical indicatrix will be $$\Delta\left(\frac{1}{n^2}\right)i = \sum_{j=1}^{6} P_{ij} \epsilon_j \quad (12)$$

Since there is no slip stress when the optical fibers isotropically undergo pressure such that they are isotropical with respect to stress, $$\epsilon_4 = \epsilon_5 = \epsilon_6 = 0 \quad \ldots (13)$$

Therefore, Pij can be expressed as a 3×3 matrix $$P_{ij} = \begin{bmatrix} P_{11} & P_{12} & P_{12} \\ P_{12} & P_{11} & P_{12} \\ P_{12} & P_{12} & P_{11} \end{bmatrix} \quad (14)$$

Thus, $$\Delta(1/n^2)_{xyz} = -(P/E)(1-2\mu)(P_{11}+2P_{12}) \quad \ldots (15)$$

Therefore, $$\Delta n = -\tfrac{1}{2}n^3 \Delta(1/n^2)_{xy} = \tfrac{1}{2}n^3(-P/E)(1-2\mu) \times (2P_{12}+P_{11}) \quad \ldots (16)$$

A variation $\Delta D$ in the diameter of the optical fiber is $$\Delta D = \epsilon_x D = -PD(1-2\mu)/E \quad \ldots (17)$$

Using a standardized frequency etc., $d\beta/dD$ can be expressed as follows:

$$\frac{d\beta}{dD} = \frac{d\beta}{db} \cdot \frac{db}{dV} \cdot \frac{dV}{dD} \quad (18)$$

$$\frac{dV}{dD} = k \cdot (n_{core}^2 - n_{clad}^2)^{\frac{1}{2}} = V/D \quad (19)$$

$$\frac{d\beta}{db} = \frac{(n_{core}^2 - n_{clad}^2)k_o^2}{2\beta} = V^2/2\beta D^2 \quad (20)$$

Thus, $$\frac{\Delta\phi}{\Delta PL} = -\frac{\beta(1-2\mu)}{E} + \frac{\beta n^2}{2E}(1-2\mu)(2P_{12}+P_{11}) - \frac{V^3(1-2\mu)}{2\beta ED^2} \cdot \frac{db}{2V} \quad (21)$$

If the single mode fibers are used as the optical fibers, $$V \gtrsim 2.4 \quad db/dV = 0.5 \quad \ldots (22)$$

The third term of Equation (21) is about $10^{-3}$ in comparison with the other terms. Disregarding the third term, the phase difference $\phi$ is given below:

$$\phi = \left\{ -\frac{\beta(1-2\mu)}{E} + \frac{\beta n^2}{2E}(1-2\mu)(2P_{12}+P_{11}) \right\} \times (L_1 P_1 - L_2 P_2) \quad (23)$$

In Equation (23) the variation of the phase difference when the wavelength varies minutely will be $$\frac{\partial \phi}{\partial \lambda} = \phi \cdot \quad (24)$$

$$\left[ -\frac{1}{\lambda} + \frac{\frac{\partial n}{\partial \lambda}\left\{\frac{1-2\mu}{E} + \frac{3n^2(1-2\mu)(2P_{12}+P_{11})}{2E}\right\}}{\frac{n(1-2\mu)}{E} + \frac{n^3(1-2\mu)(2P_{12}+P_{11})}{2E}} \right]$$

A variation $\psi$ of the phase difference when the wavelength of the laser beam is monotonically varied from $\lambda$ to $\lambda + \Delta\lambda$ is given below.

$$\psi = \frac{\partial \phi}{\partial \lambda} \Delta\lambda \quad (25)$$

$$= -\phi \frac{\Delta\lambda}{\lambda} \left[ 1 - \frac{\frac{\partial n}{\partial \lambda}\left\{\frac{1-2\mu}{E} + \frac{3n^2(1-2\mu)(2P_{12}+P_{11})}{2E}\right\}}{\frac{n(1-2\mu)}{E} + \frac{n^3(1-2\mu)(2P_{12}+P_{11})}{2E}} \right]$$

The number of optical pulses, N, is shown in Equation (5). The pressure $P_1$ or $P_2$ can be obtained from Equations (5), (25) and (23).

Tables IV and V show the characteristic and sensitivity respectively of the quartz glass with respect to pressure.

TABLE IV

| $\lambda$ | 0.63μ band | 1μ band |
|---|---|---|
| n | 1.457 | 1.451 |
| $\frac{\partial n}{\partial \lambda}$ | $-3.11 \times 10^4$/M | $-1.33 \times 10^4$/m |
| $\beta$ | $1.453 \times 10^7$/m | $0.912 \times 10^7$/m |
| $\mu$ | 0.17 | 0.17 |
| E | $7.0 \times 10^{10}$ N/m² | $7.0 \times 10^{10}$ N/m² |
| $P_{12}$ | +0.270 | +0.270 |
| $P_{11}$ | +0.121 | +0.121 |

TABLE V

| $\lambda$ | 0.63μ band | 1μ band |
|---|---|---|
| $\phi_0$ | 4.09 radians/kg/cm² · m | 2.61 radians/kg/cm² · m |
| $\phi_0/2\pi$ | 0.65 fringes/kg/cm² · m | 0.42 fringes/kg/cm² · m |
| $\psi_0$ | 4.21 Δλ/λ radians/kg/cm² · m | 2.66 Δλ/λ radians/kg/cm² · m |
| $\psi_0/2\pi$ | 0.67 Δλ/λ fringes/kg/cm² · m | 0.42 Δλ/λ fringes/kg/cm² · m |

$\phi_0$ shows a phase difference per meter between the laser beams when the fibers 8 and 10 undergo a pressure of 1 kg per cm² upon passage of laser beams of a predetermined wavelength through the fibers. At this time, optical pulses occur, the number of the optical pulses corresponding to the integer given by $\phi_0/2\pi\psi_0$ shows a variation of a phase difference per unit pressure applied for the unit length of the laser beams when the laser beams are monotonically varied from $\lambda$ to $\lambda+\Delta\lambda$. The counter 18 counts optical pulses, the number of optical pulses so counted corresponding to the value, N, of an integer of $\psi_0/2\pi$.

From Table V it will be understood that the pressure sensitivity of the system when the laser beams suffer a wavelength sweeping is proportional to the wavelength variable amount $\Delta\lambda$. Table VI shows a senser fiber length necessary to obtain a 0.5% accuracy when $\Delta\lambda/\lambda$ is 0.5% and 0.1% for the wavelength variable amount $\Delta\lambda/\lambda$ of 50 Å max.

TABLE IV

| $\lambda$ | 0.63μ band | | 1μ band | |
|---|---|---|---|---|
| $\Delta\lambda/\lambda$ | 0.5% | 0.1% | 0.5% | 0.1% |
| L | 11.9m | 59.7m | 19.1m | 95.2m |

In the actual available range, the sensitivity of the system is lower upon being measured in terms of pressure than upon being measured in terms of temperature. However, the pressure sensitivity of the system can be made more than 100 times as accurate by encapsulating the fiber with elastic material.

The optical sensing system as shown in FIG. 1 is of a so-called Mach-Zenhder interferometer type. The system of this invention is not restricted only to such type. This invention can be achieved if it is a transmissive type Michelson interferometer or a reflective type Michelson interferometer.

FIG. 3 shows a transmissive type optical sensing system. In this system, a laser beam supplied from an optical fiber 4 is changed by an optical element, such as a rod lens 30, into a parallel beam which in turn is projected onto a half mirror 32. One of both laser beams split by the half mirror 32 penetrates a crystal, such as a LiNbO$_3$ crystal, for sensing a physical quantity and is directed onto a reflective mirror 34 where it is reflected toward the half mirror 32. The other laser beam is directed toward a reflective mirror 36 where it is reflected toward the half mirror 32. At the half mirror 32 the laser beams suffer an additive interference and the resultant beam is conducted to a rod lens 40 which is optically coupled to the optical fiber 14. At the rod lens 40 the added laser beam is converged and launched into the optical fiber 14. The laser beam is detected at a photodetector 16 as an optical signal.

As well known in the art, the LiNbO$_3$ crystal 38 has its refractive index changed by applied voltage. In consequence, the optical path length in the crystal varies dependent upon voltage. The laser beam, when it passes through the crystal 38, suffers retardation. The retarded beam meets the laser beam reflected by the reflective mirror 36, producing a phase difference therebetween. As already set out in detail above, if the wavelength of the laser beam emitted from the laser unit 2 is monotonically varied from $\lambda$ to $\lambda+\Delta\lambda$, the laser beam is modulated by voltage into an alternate dark- and light-band optical signal and it is therefore possible to know a voltage applied, from the number of optical pulses, N.

Figure 4:
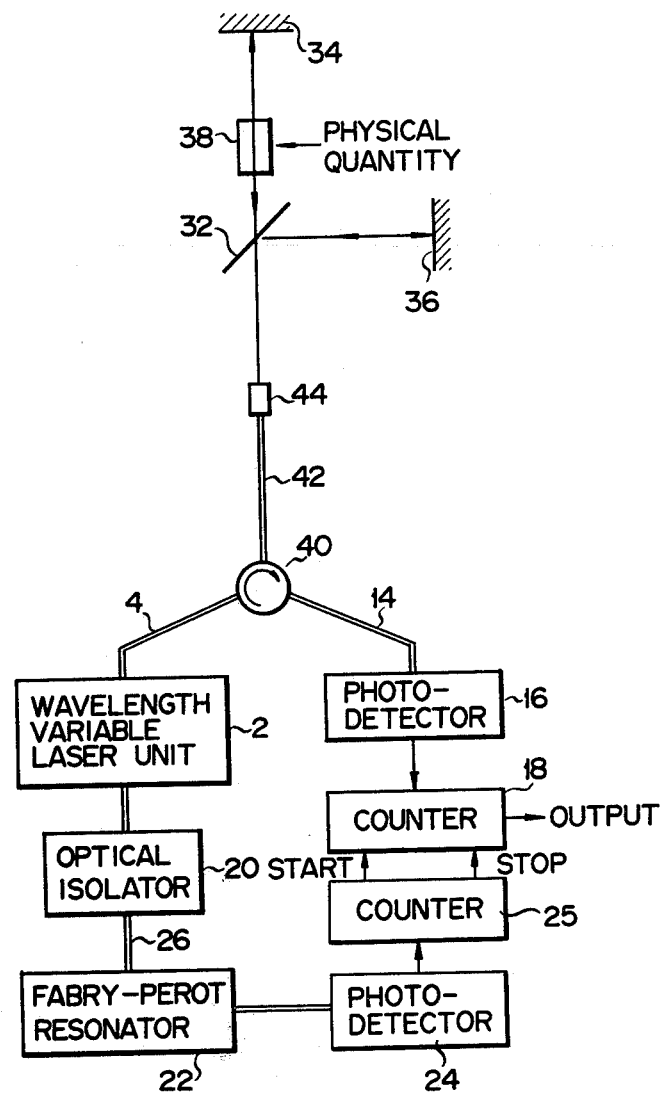

An optical sensing system of FIG. 4 is similar to the system of FIG. 3 except that it is a reflective type system. In FIG. 4 a circulator 40 is optically coupled to optical fibers 4 and 14. In this case, a laser beam transmitted through the optical fiber 4 is sent into an optical fiber 42 and an optical signal returned through the optical fiber 42 to the circulator 40 is sent into the optical fiber 14. A nonmodulated laser beam and a modulated laser beam (i.e. the optical signal) pass through the optical fiber 42. A rod lens 44 is optically coupled to the optical fiber 42 to permit the laser beam to be projected onto a half mirror 32. The optical signal which suffers interference at the half mirror 32 is launched into optical fiber 42. In the reflective type optical sensing system the optical fiber 42 is shared, as an optical path, by the nonmodulated and modulated laser beams and it is therefore possible to provide an economy of the optical fiber.

Although in the above-mentioned embodiment the temperature, pressure and voltage are listed as the physical quantity a proper sensor can be used, in place of the sensors 8, 10 and 38, for the sensing of a length and magnetic field etc.

Since according to the optical sensing system of this invention an optical signal modulated by the physical quantity is a light-and-dark band alternating, amplitude-modulated signal, the physical quantity can be accurately sensed without a substantial detection error, even if a longer optical path is used for transmission of optical signals.

What is claimed is:
1. An optical sensing system comprising:
means for generating a coherent light beam whose wavelength is monotonically varied with time over a predetermined range;
means for transferring the coherent light beam;
means for dividing the light beam transferred into two beams;
means for sensing a physical quantity which produces a phase difference between the two beams;
means for synthesizing the two beams to produce an amplitude-modulated optical signal;
means for transfering the produced optical signal; and
means for detecting an amplitude variation of the optical signal transferred, as a function of the physical quantity.
2. An optical sensing system according to claim 1, in which said means for generating a coherent laser beam causes the light beam to be monotonically increased with time.
3. An optical sensing system according to claim 1, in which said means for generating a coherent light beam causes the wavelength of the light beam to be monotonically decreased with time.
4. An optical sensing system according to claim 1, in which said means for dividing the light beam is a 3 dB optical directional coupler.
5. An optical sensing system according to claim 1, in which said means for dividing the light beam is a half mirror.
6. An optical sensing system according to claim 1, in which said sensing means comprises an optical fiber.
7. An optical sensing system according to claim 1, in which said means for synthesizing the two beams is a 3 dB optical directional coupler.
8. An optical sensing system according to claim 1, in which means for synthesizing the two beams is a half mirror.
9. An optical sensing system according to claim 1, in which said detecting means includes a photodetector which converts the amplitude-modulated optical signal to a electric pulses and a counter which counts the electric pulses.

10. An optical sensing system according to claim 1, further comprising means for detecting the predetermined wavelength change of the light beam in order to energize the optical signal detecting means and for detecting the predetermined wavelength change of the light beam to deenergize the optical signal detecting means.

11. An optical sensing system according to claim 10, in which said wavelength detecting means includes
a Fabry-Perot reasonator which converts the wavelength varying light beam to an optical inpulses, a photodetector which convents the optical impulses to electric pulses and a counter which counts the electric pulses and generates afterwards signals which are start and stop signals supplied to the optical signal detecting means.

* * * * *